United States Patent
Allpress

(10) Patent No.: US 8,867,670 B2
(45) Date of Patent: Oct. 21, 2014

(54) METHOD AND DEVICE FOR DECODING OF SIGNALS TRANSMITTED OVER FADING CHANNELS WITH MULTIPLICATIVE NOISE

(75) Inventor: Steve Allpress, Bristol (GB)

(73) Assignee: Icera Inc., Wilmington, DE (US)

( * ) Notice: Subject to any disclaimer, the term of this patent is extended or adjusted under 35 U.S.C. 154(b) by 240 days.

(21) Appl. No.: 13/380,364

(22) PCT Filed: Jun. 22, 2010

(86) PCT No.: PCT/EP2010/058796
§ 371 (c)(1),
(2), (4) Date: Jan. 19, 2012

(87) PCT Pub. No.: WO2010/149645
PCT Pub. Date: Dec. 29, 2010

(65) Prior Publication Data
US 2012/0121033 A1 May 17, 2012

(30) Foreign Application Priority Data
Jun. 23, 2009 (GB) .................................. 0910850.7

(51) Int. Cl.
*H04L 27/06* (2006.01)
*H04L 25/03* (2006.01)

(52) U.S. Cl.
CPC ............................... *H04L 25/03171* (2013.01)
USPC ............ 375/340; 375/262; 375/341; 375/227; 375/285; 714/780; 714/795

(58) Field of Classification Search
USPC .......... 375/340, 262, 341, 227, 285; 714/780, 714/795
See application file for complete search history.

(56) References Cited

U.S. PATENT DOCUMENTS

| 6,081,697 A * | 6/2000 | Haartsen ....................... 455/109 |
| 6,832,080 B1 | 12/2004 | Arslan et al. |
| 6,888,813 B1 * | 5/2005 | Kishi ............................. 370/342 |
| 2004/0136313 A1 * | 7/2004 | Goldstein et al. ............. 370/203 |
| 2009/0074112 A1 | 3/2009 | Coersmeier et al. |

FOREIGN PATENT DOCUMENTS

| GB | 2352129 A | 1/2001 |
| WO | 9418752 | 8/1994 |
| WO | 2010149645 A1 | 12/2010 |

OTHER PUBLICATIONS

German Office Action dated Jul. 16, 2013, Application No. 112010002685.8, Applicant: Nvidia Technology UK, 10 pages.
Wang, Duanyi, et al., "Low-Complexity MAP Decoding for Turbo Codes", IEEE 51st Vehicular Technology Conference Proceedings, vol. 1, Conf. 51, May 15, 2000, pp. 1035-1039. XP-000968027.

* cited by examiner

*Primary Examiner* — Leila Malek

(57) ABSTRACT

A method of generating a reliability indicator for decoding an encoded signal transmitted from a transmitter to a receiver via a wireless channel subject to fading. The method comprises: receiving symbols of the encoded signal; generating a reliability indicator for decoding at least some of the symbols selectively based on one or both of a statistical model representing additive white Gaussian noise (AWGN) in the encoded signal and a statistical model representing fading of the encoded signal; and selecting the statistical model based on signal characteristics of the wireless channel.

16 Claims, 6 Drawing Sheets

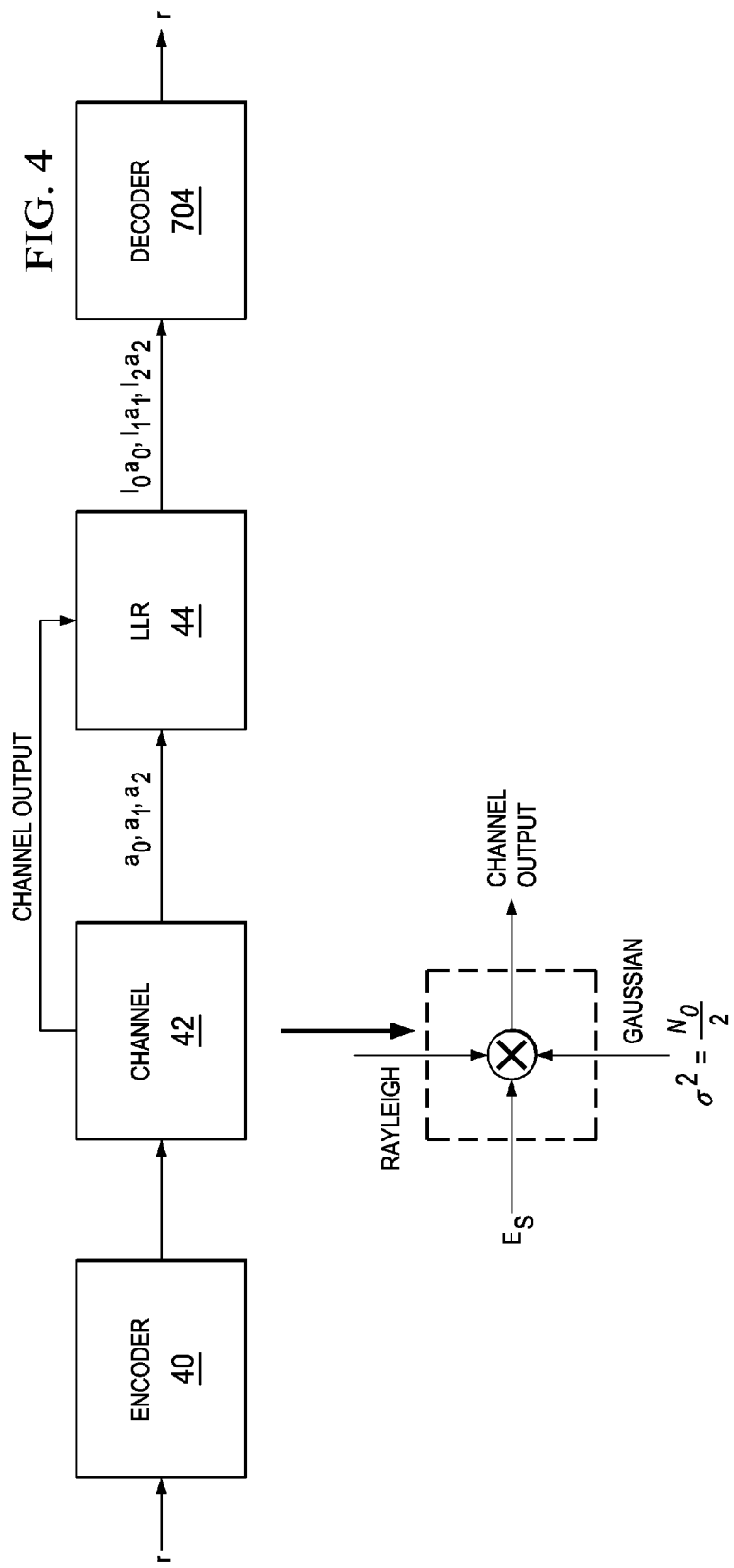

METHOD AND DEVICE FOR DECODING OF SIGNALS TRANSMITTED OVER FADING CHANNELS WITH MULTIPLICATIVE NOISE

CROSS-REFERENCE TO RELATED APPLICATION

This application is the National Stage of, and therefore claims the benefit of, International Application No. PCT/EP2010/058796 filed on Jun. 22, 2010, entitled "METHOD AND DEVICE FOR DECODING OF SIGNALS TRANSMITTED OVER FADING CHANNELS WITH MULTIPLICATIVE NOISE," which was published in English under International Publication Number WO 2010/149645 A1 on Dec. 29, 2010, and has a priority date of Jun. 23, 2009, based on application GB 0910850.7. Both of the above applications are commonly assigned with this National Stage application and are incorporated herein by reference in their entirety.

FIELD OF THE INVENTION

The present invention relates to a method and system for decoding signals in a wireless communication system and particularly but not exclusively to turbo decoding signals in a modem of a wireless communications system.

BACKGROUND OF THE INVENTION

Turbo codes are a class of high performance error correction codes that have been widely adopted in many wireless cellular standards. Turbo codes have been shown to achieve an error rate performance that is very close to the Shannon limit, the theoretical limit of maximum information transfer rate over the Additive White Gaussian Noise (AWGN) channel.

A turbo code encoder is shown in FIG. 1. The turbo code encoder comprises two encoders, encoder 1 and encoder 2 that are connected together using a concatenation scheme called parallel concatenation. The turbo code encoder is arranged to encode a frame of data together with a Cyclic Redundancy Check (CRC) code to produce systematic bits and parity bits. These bits are then punctured to produce the required code rate before the bits are transmitted from the transmitter as a sequence of symbols.

At a receiver, a turbo code decoder recovers the original frame of data and the CRC from the sequence of symbols. The turbo code decoder is shown in FIG. 2. The turbo code decoder comprises two Maximum A Posteriori (MAP) decoders, (decoder 1 and decoder 2). Each constituent MAP decoder calculates an LLR (logarithm likelihood ratio) $\Lambda(r)$ for a data bit of the received symbol as shown in Equation 1:

$$\Lambda(r) = \ln \frac{p_0(r)}{p_1(r)} \qquad \text{Equation (1)}$$

where $p_0(r)$ is the probability density function of the received ($r_x$) data if "+1" was transmitted and $p_1(r)$ is the probability density function of the received data if "−1" was transmitted. The decoding process iterates a number of times as shown in the iteration loop 220 before outputting the LLR to a hard decision block 221. The hard decision block uses the output LLR to decode the bit as a −1 or 1.

The LLR computed in the turbo code decoder is a function of the signal and noise powers and the statistics of the communication channel. Typically these estimates are derived by assuming that the channel is a stationary AWGN channel.

Modelling the channel as an AWGN channel is often an incorrect assumption. This compromises the operation of the turbo decoder and thus the sensitivity of the receiver.

More generally, the operation of any decoder, not just turbo decoders, is enhanced with the use of more appropriate LLRs. Improved LLRs can be obtained by increasing the number of samples, but this has an effect on processing time and load. Moreover, an increase in the number of samples may still adequately not deal with noise, and so may not give an improved LLR.

It is therefore an object of the invention to improve the operation of a decoder in order by providing more accurate LLRs, while not unduly increasing processor load.

SUMMARY OF THE INVENTION

According to a first aspect of the invention there is provided a method of generating a reliability indicator for decoding an encoded signal transmitted from a transmitter to a receiver via a wireless channel subject to fading, said method comprising; receiving symbols of the encoded signal; generating a reliability indicator for decoding at least some of said symbols selectively based on one or both of a statistical model representing additive white Gaussian noise (AWGN) in the encoded signal and a statistical model representing fading of the encoded signal; and selecting said statistical model based on signal characteristics of the wireless channel.

The signal characteristics are preferably indicative of speed of change of the channel. for example measured using the Doppler effect.

Another aspect of the invention provides a system for generating a reliability indicator for decoding an encoded signal transmitted via a wireless channel subject to fading, the system comprising: means for receiving symbols of the encoded signal; means for generating reliability indicators for decoding at least some of said symbols selectively based on one or both of a statistical model representing additive white Gaussian noise in the encoded signal and a statistical model representing fading of the encoded signal; and means for selecting said statistical model based on signal characteristics of the wireless channel.

The selection of the second statistical model can be in the form of selection of a modifying factor based on the second statistical model or selection of a model which represents AWGN and fading. In the case of a modifying factor, this can be provided by determining the relationship between the first statistical model and the second statistical model in which case reliability indicators are always generated using the first statistical model, and selectively modified using the modifying factor based on signal characteristics of the wireless channel.

In the second case, a choice can be made between use of the first statistical model which only represents AWGN, and the second statistical model which additionally represents fading, based on signal characteristics of the wireless channel.

Another aspect of the invention provides a method of decoding an encoded signal transmitted from a transmitter to a receiver via a wireless channel subject to fading, said method comprising; providing a first statistical model to represent additive white Gaussian noise in the encoded signal; providing a modifying factor based on a second statistical model to represent fading of the encoded signal; receiving symbols of the encoded signal; generating reliability indicators for decoding at least some of the symbols using the first statistical model; selectively using the modifying factor to modify the reliability indicators, based on signal characteristics of the wireless channel; and decoding the encoded signal using the reliability indicators.

A further aspect of the invention provides a system for generating a reliability indicator for decoding an encoded signal transmitted via a wireless channel subject to fading, the system comprising: means for receiving symbols of the encoded signal; means for generating reliability indicators for decoding at least some of said symbols selectively based on one or both of a statistical model representing additive white Gaussian noise in the encoded signal and a statistical model representing fading of the encoded signal; and means for selecting said statistical model based on signal characteristics of the wireless channel.

In the described embodiment, the statistical model which represents fading is a Rayleigh fading model. The invention can also use a model representing Ricean fading.

The invention is particularly useful in the context of rapidly changing channels where it would be very difficult to accurately represent disturbance to the signal using only the AWGN model. In order for the AWGN model to be accurate, it will be necessary to generate new estimates of signal level and signal noise very quickly, causing undue processor load and software complexity. According to described embodiments of the present invention, the need for this can be avoided by adjusting the model which is used to represent disturbance of the signal based on signal characteristics of the wireless channel.

In the described embodiment, an exact expression is derived for the log likelihood ratio (an example of a reliability indicator) when operating in the Rayleigh fading channel, which is a commonly occurring channel statistic in a non-line-of-sight wireless environment. By monitoring the channel statistics, the likelihood function can be adapted dynamically to improve overall receiver sensitivity.

For a better understanding of the present invention and to show how the same may be carried into effect, reference will now be made by way of example to the accompanying drawings.

BRIEF DESCRIPTION OF THE DRAWINGS

FIG. 4 is a schematic diagram showing a wireless communication system;
FIG. 5($b$) is a graph showing LLR values at a high signal to noise ratio $E_s/N_o$=7.0 dB.

DETAILED DESCRIPTION OF THE PREFERRED EMBODIMENTS

Figure 1:
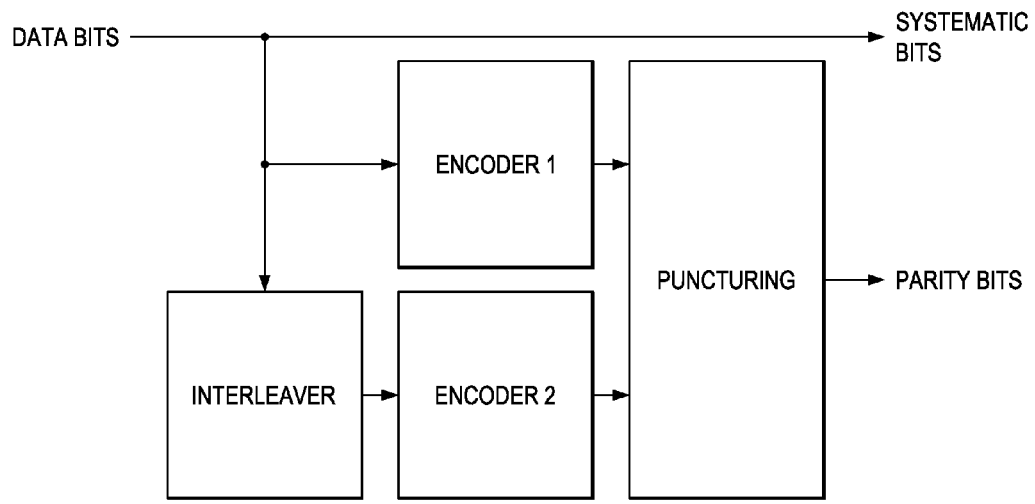
FIG. 1 is a diagram of a turbo code encoder.
Figure 3:
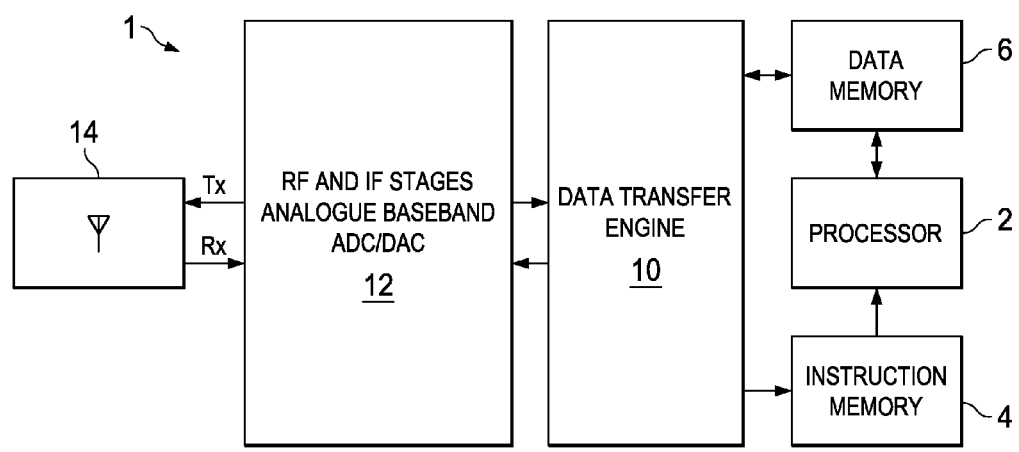
FIG. 3 is a diagram of an example platform for implementing the present invention.
Figure 2:
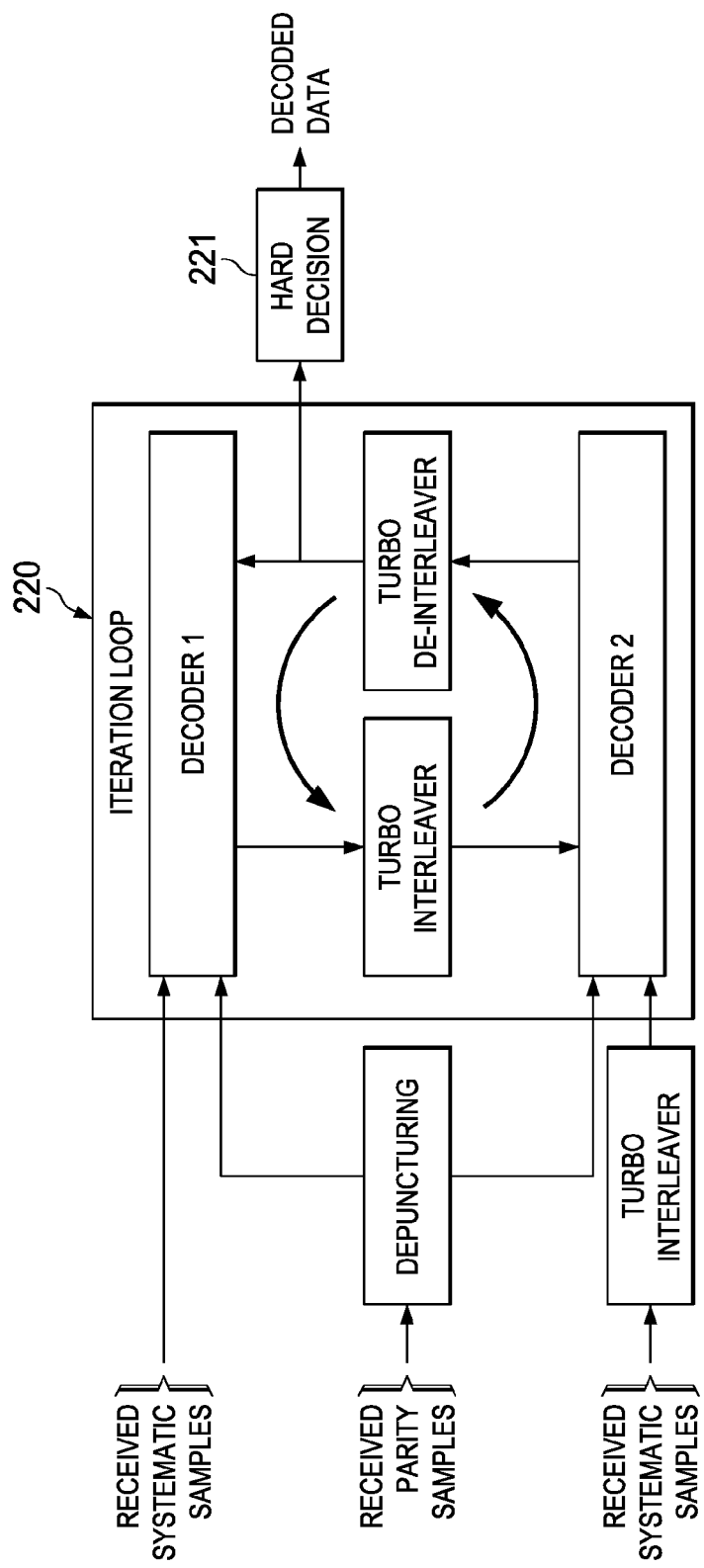
FIG. 2 is a diagram of a turbo code decoder.

FIG. 3 is a schematic block diagram of a device 1 for transmitting and receiving signals in a wireless communication system, such as a cellular communication system. In a preferred embodiment of the invention the device 1 uses a software modem, otherwise referred to as a soft modem. It will be appreciated that embodiments of the invention can however be implemented in other environments, in particular by hardware or firmware.

A software modem is a modem that is arranged to perform a significant portion of the signal processing required for the wireless communications in a generic, programmable, reconfigurable processor, rather than in dedicated hardware. For example the processor could be programmed to handle both 2G and 3G cellular standards, including for example perhaps one or more of the GSM, UMTS, EDGE, DigRF, High Speed Downlink Packet Access (HSDPA), and High Speed Uplink Packet Access (HSUPA), and 3GPP Long Term Evolution (LTE) standards.

An advantage of a soft modem type system is that it can be programmed and potentially reprogrammed to handle different protocols, algorithms, functions, radio access technologies and the like. For example, conventionally different radio access technologies would require different dedicated hardware to be included on a phone or other wireless terminal, and a terminal adapted to handle multiple radio access technologies or "multimode" terminal would have to include different sets of dedicated hardware. This problem is solved by software modem techniques, in which the differences in communicating according to different radio access technologies are handled in software.

Such a device can be realised in a number of different ways, but in the example of FIG. 3 a series of radio frequency (RF) and intermediate frequency (IF) stages 12 is arranged to receive and transmit wireless signals (Rx and Tx) via one or more antennas 14. The block 12 includes components for processing the received analogue radio signals Rx and for providing digital signal samples that represent encoded data bits. This can be achieved in different ways which are known in the art.

The samples are supplied to a data transfer engine 10 which communicates with a processor 2, an instruction memory 4 and a data memory 6. The processor can execute a number of different functions which are held in the instruction memory 4 in the form of code sequences.

In the described exemplary implementation, on the receive side, all the radio functionality from receiving RF signals from the antenna up to and including mixing down to baseband is implemented in dedicated hardware. The dedicated hardware in the receive part of the RF/IF stages in block 12 may comprise a low noise amplifier, (LNA), mixers for downconversion of the received RF signals to IF and for downconversion from IF to baseband, RF and IF filter stages, and an analog to digital conversion (ADC) stage. An ADC is provided on each of in-phase and quadrature baseband branches for each of a plurality of receive diversity branches. Similarly, on the transmit side, all the functionality from mixing up from baseband to outputting RF signals to the antenna is implemented in dedicated hardware. The dedicated hardware in the transmit part of the RF/IF stages in block 12 may comprise a digital to analog conversion (DAC) stage, mixers for upconversion of the baseband signals to IF and for upconversion from IF to RF, RF and IF filter stages, and a power amplifier (PA). Details of the required hardware for performing such basic radio functions will be known to a person skilled in the art.

However, all functionality in the baseband domain is implemented in software stored on the memory 4 and executed by the processor 2. While this is a preferred implementation, solutions where the RF/IF stage is not implemented by dedicated hardware are also envisaged. In a preferred embodiment, the chip used is manufactured by Icera and sold under the trade name Livanto®. Such a chip has a specialised processor platform described for example in WO2006/117562.

In operation, the instruction memory uploads code sequences to be executed by the processor. The processor may then be arranged to carry out a number of functions on the data samples received from the data transfer engine. In particular the instruction memory 4 is arranged to upload a code sequence to the processor 2 for decoding samples received from the data transfer engine 10.

The principle of the present invention is to improve the calculation of the LLR for use in the decoder executed in the processor 4 by improving the estimation of communication channel on which the calculation of the LLR is based. In particular the communication channel can be modelled to account for the progressive fading of the signal caused by the propagation of the received signal before it is received by the receiver. In the following embodiment of the invention, a model is described which assumes the received signal to be subject to a multiplicative Rayleigh fading and AWGN. Ricean fading can alternatively be used.

FIG. 4 is a schematic block diagram showing a basic wireless communication system in which bits r are encoded into symbols by an encoder 40 on the transmit side of the system. Reference numeral 42 denotes a wireless communication channel over which the symbols are transmitted. The channel affects the symbols according to signal characteristics of the channel such that symbols $a_0$, $a_1$, $a_2$, etc are received on the receive side of the system. These are used in block 44 to generate reliability indicators (typically in the form of log likelihood ratios). The generation of the reliability indicators is effected by the signal characteristics of the channel labelled "channel output" in FIG. 4. The reliability indicators $I_0$, $I_1$, $I_2$, etc are used to modify the received symbols as supplied to a decoder 704. The decoder decodes the symbols to generate decoded data bits r.

The block in FIG. 4 shown in broken outline is a schematic representation of the channel 42. The symbols are represented by signal energy $E_s$. The channel is subject to other disturbance, in particular additive white Gaussian noise with a variance $$\sigma^2 = \frac{N_o}{2}.$$

The channel can also be subject to fading, particularly Rayleigh fading. The combined influences are labelled "channel output".

The inventors of the present invention have derived an exact expression for the log likelihood ratio for a received signal that has been subject to multiplicative Rayleigh fading and AWGN. The derivation is shown below.

$p(r|d=+1)=$ the probability density function of the received signal r, given transmission of "+1"

$p(r|d=-1)=$ the probability density function of the received signal r, given transmission of "−1"

$p_0(r)=$ the probability that the data bit was transmitted as "+1"

$p_1(r)=$ the probability that the data bit was transmitted as "−1"

$N_0$=Noise power spectral density, estimated from channel conditions $E_s$=Symbol Energy $$p(r|d=+1) = \frac{1}{\sqrt{N_0\pi}}\exp\left[-\frac{(r-\sqrt{E_s})^2}{N_0}\right] \quad \text{Equation (2)}$$

$$p(r|d=-1) = \frac{1}{\sqrt{N_0\pi}}\exp\left[-\frac{(r+\sqrt{E_s})^2}{N_0}\right] \quad \text{Equation (3)}$$

The probability that a "+1" was transmitted is given by Equation 4:

$$p_0(r) = \quad \text{Equation (4)}$$

$$\frac{1}{\sqrt{\pi}\,N_0}\exp\left[-\frac{r^2}{N_0}\right]\int_0^\infty \exp\left[-\frac{E_s}{N_0} + \frac{2r\sqrt{E_s}}{N_0}\right] p(E_s)\,dE_s$$

The probability that a "−1" was transmitted is given by Equation 5:

$$p_1(r) = \quad \text{Equation (5)}$$

$$\frac{1}{\sqrt{\pi}\,N_0}\exp\left[-\frac{r^2}{N_0}\right]\int_0^\infty \exp\left[-\frac{E_s}{N_0} - \frac{2r\sqrt{E_s}}{N_0}\right] p(E_s)\,dE_s$$

From Equations 1, 4 and 5, for an AWGN channel the log likelihood ratio is given by Equation 6:

$$\Lambda(r) = \ln\frac{p_0(r)}{p_1(r)} = \frac{4r\sqrt{E_s}}{N_0} \quad \text{Equation (6)}$$

The probability density function for single path Rayleigh fading is given by Equation 7:

$$p(E_s) = \frac{1}{\overline{E}_s}\exp\left[-\frac{E_s}{\overline{E}_s}\right] \quad \text{Equation (7)}$$

where $\overline{E}_s$ is the mean symbol energy.

Accordingly, for an AWGN channel with Rayleigh fading the log likelihood ratio is given by Equation 8:

$$\Lambda(r) = \quad \text{Equation (8)}$$

$$\ln\left\{\frac{\int_0^\infty \exp\left[-E_s\left(\frac{1}{N_0}+\frac{1}{\overline{E}_s}\right)+\frac{2r\sqrt{E_s}}{N_0}\right]dE_s}{\int_0^\infty \exp\left[-E_s\left(\frac{1}{N_0}+\frac{1}{\overline{E}_s}\right)-\frac{2r\sqrt{E_s}}{N_0}\right]dE_s}\right\}$$

which can be shown to be:

$$\Lambda(r) = \ln\left\{\frac{r\sqrt{\pi k}\,\exp[r^2 k](1+\mathrm{erf}[r\sqrt{k}])+1}{-r\sqrt{\pi k}\,\exp[r^2 k](1-\mathrm{erf}[r\sqrt{k}])+1}\right\} \quad \text{Equation (9)}$$

-continued where $k = \dfrac{E_s}{N_0(E_s + N_0)}$, and erf is the error function.

Figure 5A:
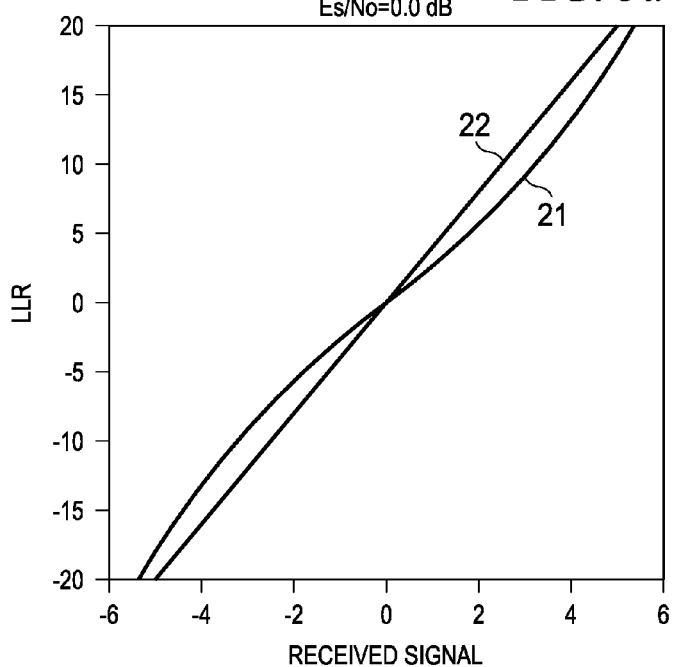
FIG. 5($a$) is a graph showing LLR values at a low signal to noise ratio ($E_s/N_o$=0.0 dB)

FIGS. 5(a) and (b) are graphs each showing the log likelihood ratio plotted against the received signal (shown as a normalised amplitude in both the positive and negative domain, but note that they are minor images) for both the Rayleigh channel, according to equation 9, shown by line 21 and the AWGN channel, according to equation 6, shown by line 22. In graph (a) the signal to noise ratio $E_s/N_0$ is 0.0 dB, whereas in graph (b) the signal to noise ratio $E_s/N_0$ is 7.0 dB.

Two important points can be derived from the graph. It can be seen that, regardless of Es/No value, both models ((a) and (b)) have similar gradients outside a mid range of signal −2 to +2 (the values represent normalised amplitudes), but have an offset. Also, by comparing graph (a) to graph (b) in the mid range it can be seen that for low signal to noise ratios the difference in gradient of the log likelihood ratio based on the AWGN calculation shown in equation 6 and the gradient of the log likelihood ratio based on the Rayleigh fading calculation shown in equation 9 is smaller than the difference at higher signal to noise ratios, as is the offset.

The changes in the difference between the LLR values calculated according to Equation 6 and Equation 9 for different signal to noise ratios is illustrated below:

Differentiating Equation 9 with respect to r and evaluating at r=0, after some manipulation yields the Rayleigh gradient as given by Equation 10:

$$\Delta \text{Rayleigh} = \left. \dfrac{d\Lambda(r)}{dr} \right|_{r=0} = 2\sqrt{k\pi} \qquad \text{Equation (10)}$$

Differentiating Equation 6 with respect to r yields the AWGN gradient as given by Equation 11:

$$\Delta AWGN = \dfrac{4\sqrt{E_s}}{N_0} \qquad \text{Equation (11)}$$

Therefore $\Delta_{AWGN}$ compared to $\Delta_{Rayleigh}$ is given by Equation 12:

$$\dfrac{\Delta AWGN}{\Delta \text{Rayleigh}} = \dfrac{2}{\sqrt{\pi}}\sqrt{1 + \dfrac{E_s}{N_0}} \qquad \text{Equation (12)}$$

Figure 6:
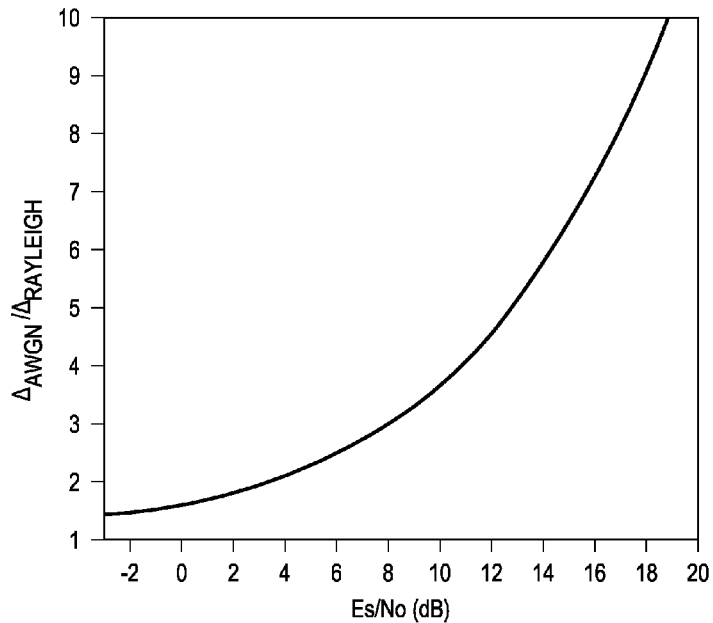
FIG. 6 is a graph showing the ratio of AWGN gradient to Rayleigh gradient with respect to signal to noise ratio at r=0.

The graph shown in FIG. 6 is a plot of the ratio given by Equation 12 for different values of $E_s/N_0$. As shown in FIG. 6 the AWGN gradient increases more rapidly for higher signal to noise values than the Rayleigh gradient.

Assuming that the transmission of the signal subjects the signal to Rayleigh fading it can therefore be seen that for increasing signal to noise ratio values the AWGN model becomes increasingly inaccurate.

The main factor which governs whether or not the signal is subject to Rayleigh fading (or other fading, e.g. Ricean) is the speed of change of the signal. This can be monitored by estimating the channel Doppler, in a manner known per se.

Calculating LLR values based on an assumption that the signal is subject to Rayleigh fading as shown in Equation 9 is mathematically more complicated than calculating LLR values based only on the assumption that the channel is an AWGN channel. Increasing the complexity of the calculations performed in the decoder is computationally expensive since the use of computational and power resources is increased.

Figure 7:
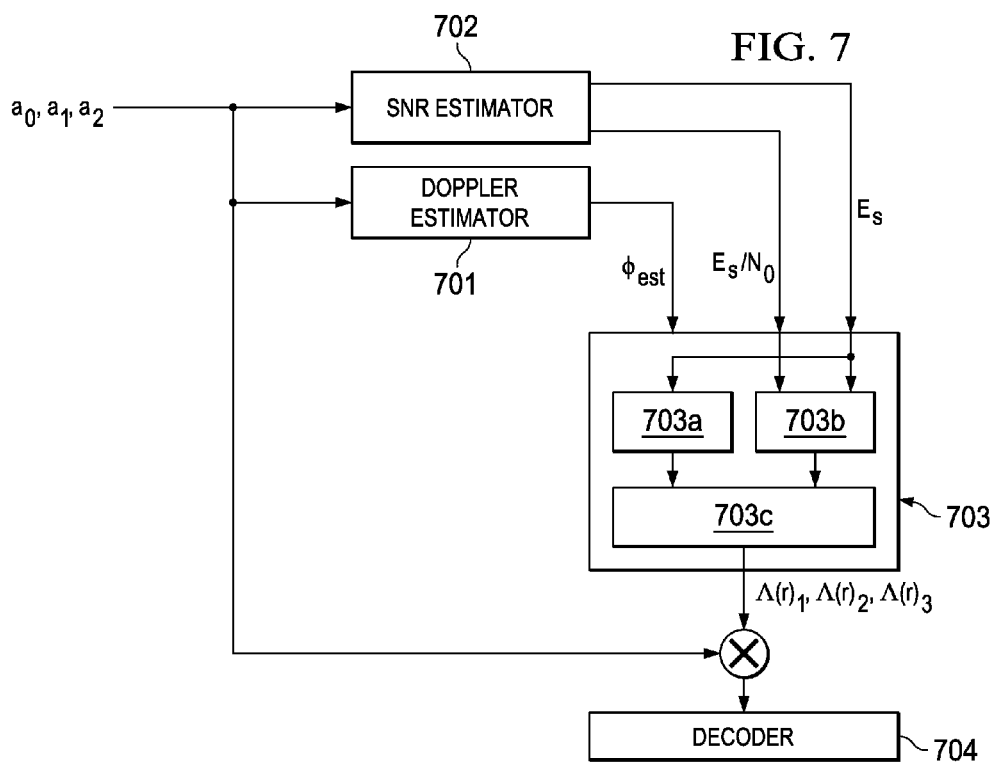
FIG. 7 is a diagram of a decode structure according to an embodiment of the present invention.

In order to reduce the use of computational and power resources, the decoder of FIG. 7 is arranged to selectively decode signals based on an AGWN channel with Rayleigh fading for predetermined channel conditions, in particular rate of change of channel as measured by the channel Doppler.

FIG. 7 shows a signal to noise ratio (SNR) estimator 702, a Doppler estimator 701, an LLR calculation selector block 703, and a decoder 704.

The SNR estimator is arranged to receive the symbols $a_0$, $a_1$, $a_2$, . . . to determine the received signal value, and the signal to noise ratio; according to Equation 13:

$$\text{SNR}=E_s/N_0 \qquad \text{Equation (13)}$$

The estimator 702 is arranged to output these values to the LLR calculation selector block 703. The LLR calculation selector block 703 is arranged to provide LLRs calculated for each symbol in dependence on the signal level determined from the estimator 702 and output $\phi_{est}$ from the Doppler estimator 701.

In one embodiment of the invention the LLR calculation selector block 703 is arranged to compare the Doppler estimate $\phi_{est}$ to a predetermined threshold $\phi_{th}$. If it is below the threshold, the LLR calculation selector block is arranged to calculate the LLR values for the symbol based only on an AWGN channel according to Equation 6. This is shown diagrammatically by block 703a.

If however the Doppler estimate provided from the estimator 701 for the received symbol is above the threshold the LLR calculation selector block 703 is arranged to apply fading using block 703b. Where the fading is applied by "derating" the LLR values using the ratio $$\dfrac{\Delta AWGN}{\Delta \text{Rayleigh}}$$

as in Equation 12, the results from blocks 703a and 703b are combined in block 703c.

In an alternative embodiment, the LLR calculation selector block could implement AWGN (Equation 6) in one function and AWGN and Rayleigh (Equation 9) in another function and switch between the two, based on the Doppler estimate. In that case, either block 703a or 703b would be in operation and there would be no need to combine them.

Figure 8:
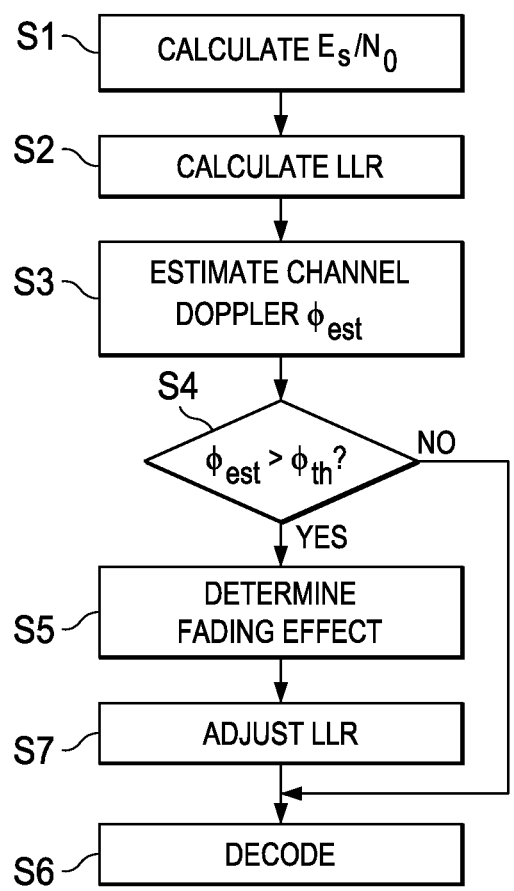
FIG. 8 is a flow chart showing the method steps according to an embodiment of the present invention.

FIG. 8 is a flow diagram showing the method steps for decoding a received symbol according to the present invention.

In step S1 the SNR estimation block 702 calculates the $E_s/N_0$ for the received symbol and outputs the ratio to the LLR calculation selector block.

In step S2, the LLR values for the received samples are calculated based on an AWGN channel according to Equation 3.

In step S3, the channel Doppler is estimated and in step S4, the LLR calculation selector block 703 is arranged to determine if the Doppler estimate is above a predetermined threshold $\phi_{th}$. If the value of $\phi_{est}$ is above the threshold the method continues to step S5, otherwise the method continues to step S6 where the calculated LLR values are supplied for decoding the samples.

Figure 5B:
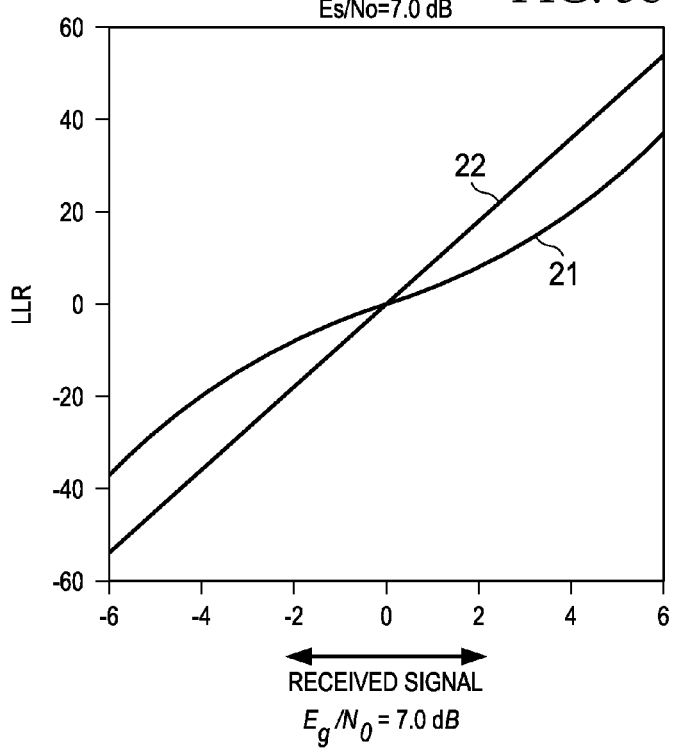

In step S5 the signal level is checked to determine the effect of fading and the proper LLR adjustment. LLR adjustment is applied in step S7 If the signal has a normalised amplitude below a certain value (e.g. below 2) the LLR values for the symbol are "de-rated" based on an AWGN channel with Rayleigh fading using the ratio in Equation 12. That is a scaling factor is applied to adjust the gradient of the curve shown in FIGS. 5a and 5b. If the signal level is above the value (in this case 2), the LLR values supplied to the decode step are calculated using the AWGN model in Equation 3 but with an offset applied to compensate for the differences between graphs 21 and 22 in FIG. 5 for signal levels above a normalised amplitude of 2.

It will be appreciated that the above embodiments are described only by way of example. Other uses and configurations will be apparent to the person skilled in the art. The scope of the invention is not limited by the described embodiments, but only be the following claims.

The invention claimed is:

1. A method of generating a reliability indicator for decoding an encoded signal transmitted from a transmitter to a receiver via a wireless channel subject to fading, said method comprising;
receiving symbols of the encoded signal;
generating a reliability indicator for decoding at least some of said symbols selectively based on one or both of a statistical model representing additive white Gaussian noise (AWGN) in the encoded signal and a statistical model representing fading of the encoded signal; and
selecting said statistical model based on signal characteristics of the wireless channel, wherein the statistical model representing AWGN is used to generate the reliability indicator for all received symbols, and wherein the statistical model representing fading is used selectively to modify the reliability indicator based on signal characteristics of the wireless channel.

2. A method as claimed in claim 1, wherein the signal characteristics are related to speed of change of the channel.

3. A method according to claim 1, wherein the statistical model representing fading is used to provide:
a scaling factor if a signal level of the received symbol is below a predetermined value, and
an offset if the signal level of the received symbol is above the predetermined value.

4. A method as claimed in claim 1, wherein the statistical model to represent fading is a Rayleigh fading model or a Ricean fading model.

5. A method as claimed in claim 1, wherein the reliability indicator is a log likelihood ratio of respective probabilities.

6. A method as claimed in claim 5, wherein the log likelihood ratio is calculated according to:

$$\Lambda(r) = \ln\left\{\frac{r\sqrt{\pi k}\ \exp[r^2 k](1 + \mathrm{erf}[r\sqrt{k}]) + 1}{-r\sqrt{\pi k}\ \exp[r^2 k](1 - \mathrm{erf}[r\sqrt{k}]) + 1}\right\}$$

where r is the sample, k is $$\frac{E_s}{N_o(E_s + N_o)}$$

and erf is an error function, where $E_s$ is the sample energy and $N_o$ is the estimated noise power spectral density.

7. A method of generating a reliability indicator for decoding an encoded signal transmitted from a transmitter to a receiver via a wireless channel subject to fading, said method comprising;
receiving symbols of the encoded signal;
generating a reliability indicator for decoding at least some of said symbols selectively based on one or both of a statistical model representing additive white Gaussian noise (AWGN) in the encoded signal and a statistical model representing fading of the encoded signal;
selecting said statistical model based on signal characteristics of the wireless channel;
estimating the channel Doppler for the received symbols; and
determining if the channel Doppler is above a predetermined threshold;
wherein the step of generating the reliability indicator uses the statistical model representing fading of the encoded signal only if the channel Doppler is above the predetermined threshold.

8. A method as claimed in claim 7, wherein if the channel Doppler is equal to or below the predetermined threshold the reliability indicator is calculated according to:

$$\Lambda(r) = \ln\frac{p_0(r)}{p_1(r)} = \frac{4r\sqrt{E_s}}{N_0}.$$

where r is a decoded data bit, $p_0(r)$ is a probability that the data bit was transmitted as "+1", $p_1(r)$ is a probability that the data bit was transmitted as "−1", $E_s$ is a symbol energy, and $N_0$ is a noise spectral density, estimated from channel conditions.

9. A method according to claim 7, wherein the statistical model representing fading is used to provide:
a scaling factor if a signal level of the received symbol is below a predetermined value, and
an offset if the signal level of the received symbol is above the predetermined value.

10. A method of decoding an encoded signal transmitted from a transmitter to a receiver via a wireless channel subject to fading, said method comprising;
providing a first statistical model to represent additive white Gaussian noise in the encoded signal;
providing a modifying factor based on a second statistical model to represent fading of the encoded signal;
receiving symbols of the encoded signal;
generating reliability indicators for decoding at least some of the symbols using the first statistical model;
selectively using the modifying factor to modify the reliability indicators, based on signal characteristics of the wireless channel; and
decoding the encoded signal using the reliability indicators.

11. A system for generating reliability indicators for decoding an encoded signal transmitted via a wireless channel subject to fading, the system comprising:
a receiver for receiving symbols of the encoded signal;
means for generating reliability indicators for decoding at least some of said symbols selectively based on one or both of a statistical model representing additive white Gaussian noise in the encoded signal and a statistical model representing fading of the encoded signal;
means for selecting said statistical model based on signal characteristics of the wireless channel;

means for estimating the channel Doppler of the received symbols;

means for determining if the channel Doppler is above a predetermined threshold; and means for selecting the statistical model representing fading of the encoded signal only if the channel Doppler is above the predetermined threshold.

12. A system according to claim 11, comprising means for determining the signal level of received symbols, wherein said means for selecting is configured to use the statistical model representing fading to provide a scaling factor if the signal level is below a predetermined value.

13. A system according to claim 11, comprising a decoder for decoding the received symbols using the reliability indicators.

14. A system according to claim 12, comprising a decoder for decoding the received symbols using the reliability indicators.

15. A system for decoding an encoded signal transmitted via a wireless channel subject to fading, the system comprising:

a first statistical model to represent additive white Gaussian noise in the encoded signal;

a modifying factor based on a second statistical model to represent fading of the encoded signal;

a receiver for receiving symbols of the encoded signal;

logic for generating reliability indicators for decoding at least some of the symbols using the first statistical model;

means for selectively using the modifying factor to modify the reliability indicators, based on signal characteristics of the wireless channel; and a decoder for decoding the encoded signal using the reliability indicators.

16. A system according to claim 15, comprising storage means holding the first statistical model and the modifying factor.

* * * * *